US008336329B2

(12) United States Patent
Uluc et al.

(10) Patent No.: US 8,336,329 B2

(45) Date of Patent: Dec. 25, 2012

(54) COOLING SYSTEM AND FREIGHT CONTAINER

(75) Inventors: Ozan Uluc, Hamburg (DE); Andreas Frey, Immenstaad (DE); Sven Reisbach, Jork (DE); Frank Bliemeister, Hamburg (DE)

(73) Assignee: Airbus Operations GmbH (DE)

( * ) Notice: Subject to any disclaimer, the term of this patent is extended or adjusted under 35 U.S.C. 154(b) by 590 days.

(21) Appl. No.: 12/532,278

(22) PCT Filed: Mar. 25, 2008

(86) PCT No.: PCT/EP2008/002354

§ 371 (c)(1), (2), (4) Date: Oct. 15, 2009

(87) PCT Pub. No.: WO2008/116628

PCT Pub. Date: Oct. 2, 2008

(65) Prior Publication Data

US 2010/0101262 A1 Apr. 29, 2010

Related U.S. Application Data

(60) Provisional application No. 60/896,531, filed on Mar. 23, 2007.

(30) Foreign Application Priority Data

Mar. 23, 2007 (DE) ........................ 10 2007 014 002

(51) Int. Cl.
*F25D 17/04* (2006.01)

(52) U.S. Cl. ........................................... 62/407; 62/412

(58) Field of Classification Search .................... 62/407, 62/412, 406, 409, 239, 299, 454
See application file for complete search history.

(56) References Cited

U.S. PATENT DOCUMENTS

| | | | | | |
|---|---|---|---|---|---|
| 2,499,736 | A | * | 3/1950 | Af Kleen | 62/59 |
| 2,694,537 | A | * | 11/1954 | Reichert | 244/118.5 |
| 3,440,834 | A | * | 4/1969 | Hirai et al. | 62/409 |
| 3,447,334 | A | * | 6/1969 | Kimball | 62/64 |
| 3,519,224 | A | * | 7/1970 | Boyd et al. | 244/23 R |
| 3,695,056 | A | * | 10/1972 | Glynn et al. | 62/168 |

(Continued)

FOREIGN PATENT DOCUMENTS

DE 1 601 899 5/1970

(Continued)

OTHER PUBLICATIONS

PCT International Search Report for PCT/EP2008/002354 completed by the EP Searching Authority on Jul. 18, 2008.

(Continued)

*Primary Examiner* — Mohammad Ali

(74) *Attorney, Agent, or Firm* — Barnes & Thornburg LLP

(57) ABSTRACT

A system (10) for cooling freight goods on board an aircraft comprises a refrigerating apparatus and a cooling station (14) to which cooling energy generated by said refrigerating apparatus is fed by means of a refrigerating medium and which is connected to an air infeed line (29) of an air-conditioning installation of the aircraft, wherein an air outlet aperture (16) of the cooling station (14) is connectable to a freight compartment (24) of the aircraft in order to discharge into said freight compartment (24) air which has been cooled down to a desired temperature.

25 Claims, 4 Drawing Sheets

U.S. PATENT DOCUMENTS

| | | | | |
|---|---|---|---|---|
| 4,276,752 | A * | 7/1981 | Modler et al. | 62/166 |
| 4,901,538 | A * | 2/1990 | Anthony | 62/237 |
| 5,598,713 | A * | 2/1997 | Bartilucci | 62/78 |
| 5,916,256 | A * | 6/1999 | Westerholm et al. | 62/406 |
| 6,813,898 | B2 * | 11/2004 | Lindsay et al. | 62/228.4 |
| 6,860,115 | B2 * | 3/2005 | Norelius et al. | 62/387 |
| 2002/0066284 | A1 * | 6/2002 | Lindsey et al. | 62/406 |
| 2003/0041601 | A1 * | 3/2003 | Graham et al. | 62/52.1 |
| 2003/0101742 | A1 * | 6/2003 | Norelius et al. | 62/387 |
| 2004/0035139 | A1 * | 2/2004 | Lindsey et al. | 62/371 |
| 2005/0051668 | A1 | 3/2005 | Atkey et al. | |

FOREIGN PATENT DOCUMENTS

| | | | |
|---|---|---|---|
| DE | 1601899 | A1 | 5/1970 |
| DE | 19952524 | A1 | 5/2001 |
| DE | 10361686 | A1 | 8/2005 |
| DE | 102006017012 | | 10/2007 |
| EP | 0577869 | A1 | 7/1992 |
| RU | 2062964 | C1 | 6/1996 |
| WO | WO 01/26967 | | 4/2001 |
| WO | WO 2004/045987 | | 6/2004 |
| WO | WO 2005/047784 | | 5/2005 |
| WO | WO 2005/052537 | | 6/2005 |
| WO | 2006/105049 | A2 | 10/2006 |
| WO | WO 2006/105049 | | 10/2006 |

OTHER PUBLICATIONS

Decision to Grant for parallel Russian Patent Application No. 2009137482 by the Russian Patent Office dated Feb. 21, 2012 (English Translation).

* cited by examiner

COOLING SYSTEM AND FREIGHT CONTAINER

CROSS-REFERENCE TO RELATED APPLICATIONS

This application is a U.S. national counterpart application of international application serial No. PCT/EP2008/002354 filed Mar. 25, 2008, which claims priority to U.S. Provisional Patent Application No. 60/896,531 filed Mar. 23, 2007 and to German Patent Application No. 102007014002.0 filed Mar. 23, 2007.

The invention relates to a system for cooling freight goods on board an aircraft, and also to a freight container, which is connectable to the cooling system, for receiving freight goods which are intended for transport in the freight compartment of an aircraft.

The transport of freight goods by air is increasingly gaining in importance, particularly because of the very short transport times which are possible by this means. However, many freight goods also have to be cooled during transport, wherein in many cases interruption of the cooling chain is not desirable or permitted. In order to guarantee proper storage conditions during transport on board an aircraft for freight goods which are to be stored under cool conditions, two different approaches are followed at present.

A first approach consists in air-conditioning, with the aid of the air-conditioning installation of the aircraft, a freight compartment or a freight compartment zone, in which air freight goods which are to be stored under cool conditions are accommodated. For this purpose, the freight compartment or the freight compartment zone, which is to be cooled is connected to the air-conditioning installation of the aircraft via additional connections which are provided on said air-conditioning installation of the aircraft. Provided that the doors of the cabin and the freight compartment are closed, it is usually possible, with the aid of the air-conditioning installation of the aircraft, to set temperatures in the range between +5° C. and +25° C. in the freight compartment or the freight compartment zone, which is to be cooled.

An air-conditioning installation of an aircraft basically has two independent air-conditioning systems. Both air-conditioning systems of the air-conditioning installation of the aircraft serve primarily for air-conditioning the aircraft cabin, although one of the two air-conditioning systems of said air-conditioning installation of the aircraft can also be used for air-conditioning the freight compartment or the freight compartment zone, which is to be cooled. An air-conditioning installation of an aircraft, which is equipped with additional air-conditioning pipes, regulating valves, etc. for air-conditioning the freight compartment or the freight compartment zone, which is to be cooled, is relatively complex and costly. In addition to this, an air-conditioning installation of this kind in an aircraft has an elevated weight and an increased energy consumption. A further disadvantage of cooling the freight compartment or the freight compartment zone with the aid of the air-conditioning installation of the aircraft consists in the fact that, under certain circumstances, it is not possible, when the doors of the freight compartment are open, to guarantee adequate air-conditioning of the freight compartment or the freight compartment zone, which is to be cooled. Furthermore, no provision is currently made, for reasons connected with icing-up, for negative temperatures when cooling a freight compartment or a freight compartment zone with the aid of the air-conditioning installation of the aircraft. Finally, when the freight compartment or the freight compartment zone is cooled with the aid of the air-conditioning installation of the aircraft, the entire freight compartment, or at least a relatively large freight compartment zone is cooled, so that freight goods which need to be transported at higher temperatures cannot be loaded into the same freight compartment or freight compartment zone. Consequently, it is not possible, under certain circumstances, to utilise the aircraft's freight-transporting capacity to the optimum extent.

It is therefore known practice, in order to make better use of an aircraft's freight-transporting capacity, to employ cooled special containers for transporting freight goods which are to be stored under cool conditions, in addition to, or as an alternative to, cooling the freight compartment or a freight compartment zone with the aid of the air-conditioning installation of the aircraft. Special containers of this kind comprise a storage receptacle for receiving dry ice, and also a battery-operated fan. The fan serves to, initially, conduct air over the dry ice which acts as a heat sink, and then to blow the cooled air over the freight goods which are to be cooled. The running of the fan is usually controlled with the aid of an electronic control unit. Depending upon the state of loading of the storage receptacle for the dry ice, it is possible to set temperatures in the range between −20° C. and +20° C. in a cooled special container, even when the doors of the freight compartment are open. An extension of this temperature range to a range between −20° C. and +30° C. is possible by integrating an additional heating unit into the special container. Under these circumstances, however, the lowest temperature of −20° C. is achieved only in the unstable state, that is to say constant cooling at −20° C. is not possible.

However, special containers of this kind which are cooled with the aid of dry ice have the disadvantage that a complicated consumption calculation, which depends upon various factors such as, for example, the environmental conditions, the payload and the target temperature, is necessary, prior to loading, in order to determine the quantity of dry ice to be loaded into the storage receptacle. In addition to this, the special container has an increased empty weight, and therefore a reduced loading capacity, as a result of the necessity of having to additionally load up to 300 kg of dry ice, and also because of the weight of the other components which are necessary for cooling the container. Moreover, the operating duration is limited because of the limited storage capacity for dry ice and also because of the limited battery capacity of the fan.

Further disadvantages directly arise from the use of dry ice as the heat sink. For example, cooling with dry ice leads to inhomogeneous temperature distribution within the container because of the fact that completely uniform distribution of the air over the freight goods is not possible with the fan which is employed for distributing the cooled air. In addition to this, dry ice releases $CO_2$ and therefore has to be declared as a hazardous substance. Consequently it is necessary, when transporting dry ice, to adhere to regulations regarding the transport of hazardous substances and also, usually, to adhere to maximum payloads which depend upon the type of aircraft. Finally, the transport of certain freight goods together with dry ice is prohibited, or else it is necessary to at least adhere to minimum distances between the freight goods and the dry ice.

The object underlying the invention is to make available a cooling system, and also a freight container that is connectable to said cooling system, by means of which freight container and cooling system, energy-efficient and reliable cooling of freight goods on board an aircraft is possible.

In order to achieve this object, a system for cooling freight goods on board an aircraft comprises, according to a first embodiment of the invention, a refrigerating apparatus and a cooling station to which cooling energy generated by said refrigerating apparatus is fed by means of a refrigerating medium and which is connected to an air infeed line of an air-conditioning installation of an aircraft. An air outlet aperture of the cooling station is connectable to a freight compartment, or to a freight compartment zone which may optionally be thermally insulated, of the aircraft, in order to discharge air which has been cooled down to a desired temperature into the freight compartment or the freight compartment zone.

In the cooling system according to the invention, the cooling energy necessary for cooling the air which is to be discharged into the freight compartment may be made available, as required, either by the air-conditioning installation of the aircraft or by the refrigerating apparatus which is thermally connected to the cooling station. For example, in operating situations in which the air-conditioning installation of the aircraft is not utilised to the full in other ways, the air may be fed to the cooling station of the cooling system according to the invention already pre-cooled or even cooled down to the desired temperature, by the air-conditioning installation of the aircraft. The cooling energy made available by the refrigerating apparatus may then be utilised at some other point in the aircraft. If, on the other hand, the air-conditioning installation of the aircraft cannot make available sufficient cooling energy for cooling down the air to be discharged into the freight compartment to the low temperature desired, the supplying of cooling energy is partially or completely taken over by the refrigerating apparatus of the cooling system according to the invention.

This guarantees reliable and energy-efficient cooling of freight goods which are to be stored under cool conditions. In addition to this, the load on the air-conditioning installation of the aircraft is greatly relieved as a result of the fact that the supplying of cooling energy can, if necessary, be partially or completely taken over by the refrigerating apparatus of the cooling system according to the invention. Finally, the system according to the invention can be designed in a relatively simple manner in such a way that it is possible to set temperatures in the freight compartment of the aircraft which lie within a range which is markedly expanded, compared to the temperature range that can be set solely with the aid of the air-conditioning installation of the aircraft.

The refrigerating apparatus may be connected to the cooling station, for example, via a cooling circuit in which the refrigerating medium is conveyed in a circuit with the aid of a conveying apparatus, such as a pump for example. As the refrigerating medium, use may be made, for example, of $CO_2$, R134A ($CH_2F$—$CF_3$) or Galden® HT135, which is obtainable from the company Solvay Solexis. The cooling station is preferably constructed as an air-cooling apparatus having a heat-exchanger. The air fed to the cooling station can then be cooled down to the desired low temperature in the heat exchanger as a result of the thermal contact with the refrigerating medium conducted through said heat exchanger, and can subsequently be discharged through the air outlet aperture into the freight compartment, or the freight compartment zone, which is to be cooled. The system according to the invention for cooling freight goods on board an aircraft may comprise only one cooling station, but also, if necessary, a number of cooling stations which are connectable to the freight compartment or to a freight compartment zone of the aircraft, which may optionally be thermally insulated.

Basically, the refrigerating apparatus of the system according to the invention for cooling freight goods on board an aircraft may be constructed separately from other cooling systems that are present on board the aircraft. However, the refrigerating apparatus of the system according to the invention is preferably integrated into a central cooling system of the aircraft. Said refrigerating apparatus is then formed by a central refrigerating apparatus which is disposed, for example, in the under-floor region of the aircraft and is connected to a plurality of cooling stations via a cooling circuit. Cooling stations of the central cooling system which do not serve to cool the freight compartment of the aircraft may, for example, be provided for the purpose of supplying food containers disposed in the region of the galleys with cold air and/or feeding cooling energy to electronic components of an avionics system.

The individual cooling stations of the central cooling system are preferably disposed close to their places of use. Accordingly, a cooling station for cooling food containers may be disposed close to a galley, a cooling station for cooling the electronic components of the avionics system may be disposed underneath the cockpit, and a cooling station for cooling the freight compartment of the aircraft may be disposed close to said freight compartment, for example in the lateral triangular regions of the aircraft.

The system according to the invention for cooling freight goods may be controlled and monitored in a relatively simple manner and without major additional expense, particularly if said system is integrated into a central cooling system of an aircraft. For example, a valve which can be activated electronically and which permits the feeding-in of cooling energy from the refrigerating apparatus to the cooling station when in the open state and interrupts said feeding-in when in the closed state, may be disposed in the cooling circuit between the refrigerating apparatus and the cooling station that is connectable to the freight compartment of the aircraft. In similar manner, it is possible to dispose, between the cooling station and the freight compartment, a valve which can be activated electronically and which permits the feeding-in of cooling energy into the freight compartment when in the open state and interrupts said feeding-in when in the closed state. In addition to this, data, for example temperature data, from the freight compartment of the aircraft can be fed into the network of the central cooling system and thus be easily monitored from the cockpit or the cabin.

The air outlet aperture of the cooling station which is provided in the system according to the invention for cooling freight goods on board an aircraft is preferably connectable to an air inlet aperture provided in a casing of the freight compartment. A connecting line, which is constructed integral with the cooling station and is connected, in a sealing manner, to the air inlet aperture constructed in the casing of the freight compartment, may, for example, be provided for connecting the air outlet aperture of the cooling station to said air inlet aperture which is provided in the casing of the freight compartment. As an alternative to this, the connecting line may also be fastened detachably to the cooling station and be connected to the air outlet aperture of said cooling station in a sealing manner.

The system according to the invention for cooling freight goods on board an aircraft also preferably has an air outlet aperture which is provided in the casing of the freight compartment and is connectable to an air return line of the air-conditioning installation of the aircraft. The cold air fed into the freight compartment can thereby be conveyed in a circuit, that is to say, the cold air which has been warmed up as a result of the thermal contact with the freight goods to be cooled can be conveyed back into the air-conditioning installation of the aircraft, and again be cooled down, there and/or in the cooling station of the cooling system according to the invention, to the desired low temperature.

If necessary, there may be disposed, in all the lines of the system according to the invention, suitable valves for controlling the flow through said lines. There is preferably disposed, in all the air-conveying lines of the system which connect the freight compartment to a region of the aircraft which lies outside said freight compartment, a valve for controlling the flow of air through said lines. The flow of air through the air-conveying lines can be interrupted by closing the valve/valves. This is particularly important in the event of a fire in the freight compartment of the aircraft, since said freight compartment can then be isolated and flooded with a fire-extinguishing agent.

According to a second embodiment of the invention, a system for cooling freight goods on board an aircraft comprises a refrigerating apparatus and a cooling station to which cooling energy generated by said refrigerating apparatus is fed by means of a refrigerating medium and which is connected to an air infeed line of an air-conditioning installation of the aircraft, wherein an air outlet aperture of the cooling station is connectable to a freight container disposed in a freight compartment of the aircraft, in order to discharge into said freight container air which has been cooled down to a desired temperature. As distinct from the first embodiment, which has been described above, of a system for cooling freight goods on board an aircraft, a system of this kind permits the selective cooling of individual freight containers disposed in the freight compartment of an aircraft. In other respects, the refrigerating apparatus and the cooling station of the cooling system can be constructed as has been described above in connection with the first embodiment of the invention.

The air outlet aperture which is constructed on the cooling station of the system according to the invention for cooling freight goods on board an aircraft preferably is connectable to an air inlet aperture which is provided in a wall of a freight container. In this way, the cooling station of the cooling system can be connected to the freight container in a simple manner in order to feed air which has been cooled down to a desired temperature to said freight container.

A first coupling element is preferably provided for connecting the air outlet aperture of the cooling station to the air inlet aperture provided in the wall of the freight container. The first coupling element may, for example, be routed through a first connecting aperture constructed in a casing of the freight compartment. With the aid of the first coupling element, the air outlet aperture of the cooling station can be connected in a particularly simple manner to the air inlet aperture constructed in the wall of the freight container, when said freight container is positioned at the appropriate position in the freight compartment of the aircraft.

The first coupling element may comprise a first sealing element for connecting said first coupling element to the air outlet aperture of the cooling station in a sealing manner. As an alternative to this, however, the first coupling element may also be constructed integral with the cooling station in such a way that it is possible to dispense with the first sealing element. Furthermore, the first coupling element may comprise a second sealing element for connecting said first coupling element in a sealing manner to the air inlet aperture provided in the wall of the freight container. A first coupling element which is constructed in this way ensures that the air which has been cooled down to the desired low temperature can be discharged into the freight container without significant losses.

The system according to the invention for cooling freight goods on board an aircraft preferably also comprises an air outlet aperture which is provided in the wall of the freight container and which is connectable to an air return line of the air-conditioning installation of the aircraft. The cold air fed to the freight container can thereby be conveyed in a circuit, that is to say, the cold air which has been warmed up as a result of the thermal contact with the freight goods to be cooled can be conveyed back into the air-conditioning installation of the aircraft, and again be cooled down, there and/or in the cooling station of the cooling system according to the invention, to the desired low temperature.

For the purpose of connecting the air return line of the air-conditioning installation of the aircraft to the air outlet aperture provided in the wall of the freight container, there is preferably provided a second coupling element which permits rapid and simple connection of said air return line of the air-conditioning installation of the aircraft to the air outlet aperture constructed in the wall of the freight container. The second coupling element can be routed through a second connecting aperture constructed in the casing of the freight compartment.

The second coupling element may comprise a first sealing element for connecting said second coupling element to the air return line of the air-conditioning installation of the aircraft in a sealing manner. As an alternative to this, however, the second coupling element may also be constructed integral with the air return line of the air-conditioning installation of the aircraft in such a way that it is possible to dispense with the first sealing element. Furthermore, the second coupling element may comprise a second sealing element for connecting said second coupling element in a sealing manner to the air outlet aperture provided in the wall of the freight container.

There is preferably disposed, in all the air-conveying lines of the system which connect the freight compartment to a region of the aircraft which lies outside said freight compartment, a valve for controlling the flow of air through said lines. The flow of air through the air-conveying lines can be interrupted by closing the valve/valves. This is particularly important in the event of a fire in the freight compartment of the aircraft, since said freight compartment can then be isolated and flooded with a fire-extinguishing agent.

A freight container according to the invention for receiving freight goods which are intended for transport on board an aircraft is connectable to a cooling station of an above-described system for cooling freight goods on board an aircraft. Air which has been cooled down to a desired low temperature in the air-conditioning installation of the aircraft and/or in the cooling station is dischargable directly into the freight container by connecting the freight container according to the invention to the cooling station of the cooling system. The freight container according to the invention permits reliable and energy-efficient cooling of freight goods which have been stored in said freight container.

The freight container according to the invention has a series of advantages compared with cooled freight containers which are known from the prior art. Since dry ice is no longer necessary for cooling the container, the freight container according to the invention has a reduced empty weight and therefore an increased loading capacity. In addition to this, the abovedescribed disadvantages that occur in connection with the use of dry ice for cooling freight goods which are stored in a freight container are avoided.

The freight container preferably has an air inlet aperture which is provided in a wall of said freight container and which can be connected to an air outlet aperture of the cooling station. The freight container can thus be connected to the cooling station of the cooling system in a rapid and simple manner.

In addition to this, the freight container may have an air outlet aperture which is provided in the wall of said freight container and which is connectable to an air return line of the air-conditioning installation of the aircraft. The cold air fed to the freight container can then be conveyed back, after being warmed up as a result of the thermal contact with the freight goods stored in said freight container, into the air-conditioning installation of the aircraft, and again be cooled down, there and/or in the cooling station of the cooling system according to the invention, to the desired low temperature.

A third embodiment of a system according to the invention for cooling freight goods on board an aircraft comprises a refrigerating apparatus which is connectable to a cooling station in order to feed cooling energy generated by said refrigerating apparatus to said cooling station by means of a refrigerating medium. In this case, the refrigerating apparatus and the cooling station may be constructed as has been explained above in connection with the first embodiment of the cooling system according to the invention. The third embodiment of the cooling system according to the invention is distinguished by the fact that the cooling station is integrated into a freight container for receiving freight goods which are intended for transport in a freight compartment of an aircraft, is connectable to an air infeed line of an air-conditioning installation of the aircraft, and has an air outlet aperture so that air which has been cooled down to a desired temperature is dischargable into said freight container. As a result of the integration of the cooling station into the freight container which is to be cooled, it is possible to utilise the space for installing the cooling station on board the aircraft in some other way. In addition to this, the mounting, and also the servicing, of a cooling station which is integrated into a freight container is simpler and more cost-effective than the mounting and servicing of a cooling station which is fixedly installed on board an aircraft.

In the third embodiment of the system according to the invention for cooling freight goods on board an aircraft, the refrigerating apparatus of the system preferably has a refrigerating medium outlet aperture which is connectable to a refrigerating medium inlet aperture provided in a wall of the freight container. The cooling station integrated into the freight container can thus be connected in a rapid and simple manner to a cooling circuit which is connected to the refrigerating apparatus.

A first connecting element may be provided for connecting the refrigerating medium outlet aperture of the refrigerating apparatus to the refrigerating medium inlet aperture provided in the wall of the freight container. Said connecting element may be routed through a first connecting aperture constructed in a casing of the freight compartment.

The first connecting element may comprise a first sealing element for connecting said first connecting element to the refrigerating medium outlet aperture of the refrigerating apparatus in a sealing manner. As an alternative to this, however, said first connecting element may also be constructed integral with the refrigerating apparatus of the cooling system according to the invention and/or may form a section of a cooling circuit which is connected to said refrigerating apparatus and to which other cooling stations of a central cooling system of the aircraft may be connected. Furthermore, the first connecting element may be provided with a second sealing element for connecting said first connecting element in a sealing manner to the refrigerating medium inlet aperture provided in the wall of the freight container.

The refrigerating apparatus of the system according to the invention for cooling freight goods on board an aircraft may also have a refrigerating medium inlet aperture which is connectable to a refrigerating medium outlet aperture provided in the wall of the freight container. Refrigerating medium which has been cooled down to a low temperature by the refrigerating apparatus and which has been warmed up in the cooling station integrated into the freight container by giving off its cooling energy to the air flowing through said cooling station, can thus be conveyed back into the refrigerating apparatus, where it can be cooled down again to the desired low temperature.

For the purpose of connecting the refrigerating medium inlet aperture of the refrigerating apparatus to the refrigerating medium outlet aperture provided in the wall of the freight container, there is preferably provided a second connecting element which permits rapid and simple connection of said refrigerating medium inlet aperture of the refrigerating apparatus to the refrigerating medium outlet aperture in the wall of the freight container. Said second connecting element is preferably routed through a second connecting aperture constructed in a casing of the freight compartment.

The second connecting element may comprise a first sealing element for connecting said second connecting element to the refrigerating medium inlet aperture of the refrigerating apparatus in a sealing manner. As an alternative to this, however, said first connecting element may also be constructed integral with the refrigerating apparatus and/or may form a section of a cooling-circuit which is connected to said refrigerating apparatus and to which other cooling stations of a central cooling system of the aircraft may be connected. In addition to this, the second connecting element may comprise a second sealing element for connecting said second connecting element in a sealing manner to the refrigerating medium outlet aperture provided in the wall of the freight container.

The cooling system according to the invention preferably also has an electrical connecting element for the electrical connection of the cooling station integrated into the freight container, which electrical connecting element is routed through a third connecting aperture constructed in the casing of the freight compartment. Said electrical connecting element makes it possible to supply the cooling station integrated into the freight container with electrical energy in a simple manner via the network of a central cooling system or the on-board network of the aircraft, as soon as the freight container is located in its intended position on board the aircraft.

There is preferably disposed, in all the air-conveying lines of the system which connect the freight compartment to a region of the aircraft which lies outside said freight compartment, a valve for controlling the flow of air through said lines. The flow of air through the air-conveying lines can be interrupted by closing the valve/valves. This is particularly important in the event of a fire in the freight compartment of the aircraft, since said freight compartment can then be isolated and flooded with a fire-extinguishing agent.

A second embodiment of a freight container according to the invention for receiving freight goods which are intended for transport on board an aircraft comprises a cooling station which is integrated into said freight container. This cooling station is connectable to a refrigerating apparatus of an above-described system for cooling freight goods on board an aircraft, so that air which has been cooled down to a desired temperature is dischargable into the freight container. The cold air fed to said freight container can be used for cooling freight goods stored in the freight container.

The freight container preferably has a refrigerating medium inlet aperture which is provided in a wall of said freight container and is connectable to a refrigerating medium outlet aperture of the refrigerating apparatus. The cooling station integrated into the freight container can thus be integrated in a simple manner into a cooling circuit via which the cooling energy generated by the refrigerating apparatus can be transferred, by means of the refrigerating medium, to the cooling station which is integrated into the freight container.

Said freight container also has a refrigerating medium outlet aperture which is provided in the wall of said freight container and to which a refrigerating medium inlet aperture of the refrigerating apparatus is connectable. As a result, the refrigerating medium which has been cooled down to the desired low temperature by the refrigerating apparatus and which has been warmed up by giving off its cooling energy on passing through the cooling station, can be conveyed back to the refrigerating apparatus, where it can be cooled down again to the desired low temperature.

The freight container according to the invention also has an electrical connector which is provided in a wall of said freight container and which can be connected to the electrical connecting element of the cooling system, for the electrical connection of the cooling station which is integrated into the freight container.

Preferred embodiments of the invention will now be explained in greater detail with the aid of the appended diagrammatic drawings, in which.

Figure 2:
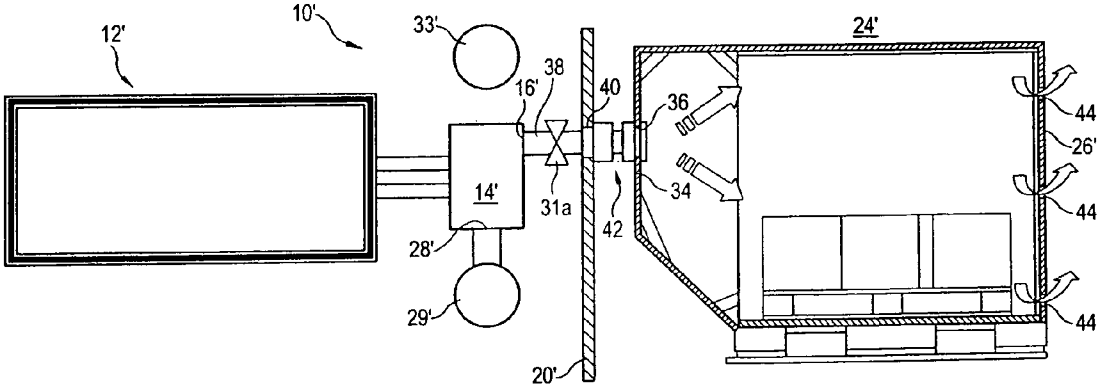
FIG. 2 shows a second embodiment of a system according to the invention for cooling freight goods on board an aircraft and a first embodiment of an associated freight container for receiving said freight goods.
Figure 3:
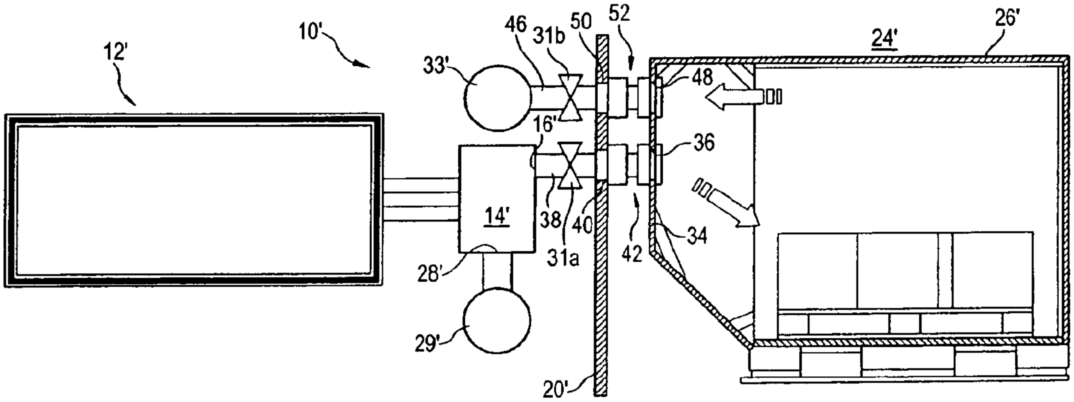
Figure 4:
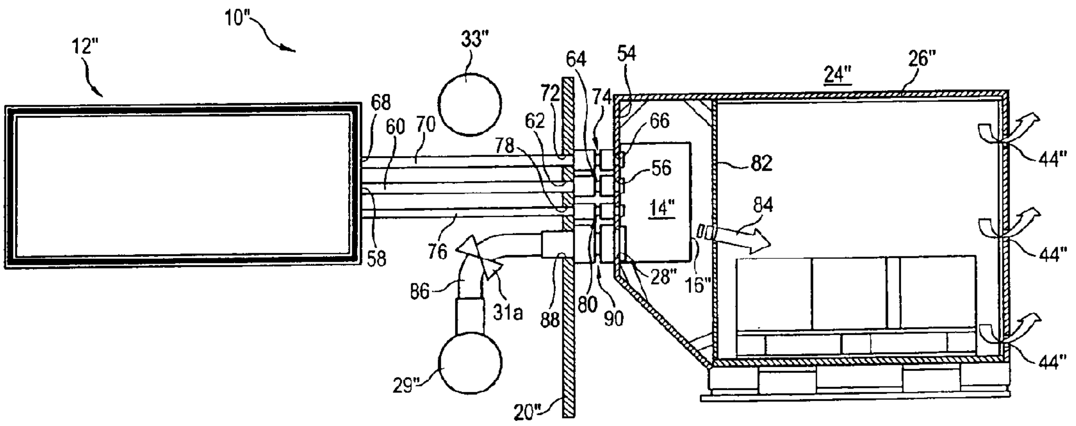

FIG. 3 shows a modification of the second embodiment, which is represented in FIG. 2, of a system for cooling freight goods on board an aircraft and a modification of the first embodiment, which is represented in FIG. 2, of an associated freight container for receiving said freight goods; and FIG. 4 shows a third embodiment of a system for cooling freight goods on board an aircraft and an associated second embodiment of a freight container according to the invention for receiving said freight goods.

Figure 1:
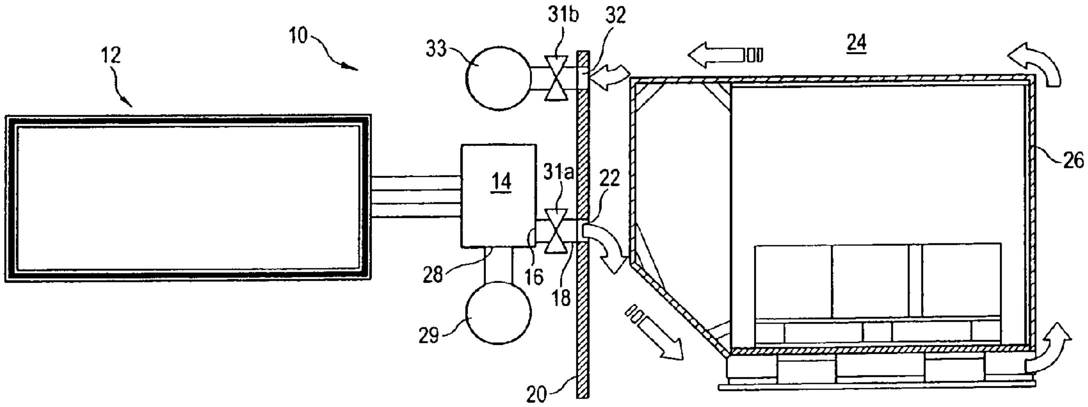
FIG. 1 shows a first embodiment of a system according to the invention for cooling freight goods on board an aircraft.

A first embodiment of a system 10 for cooling freight goods on board an aircraft is shown in FIG. 1. Said system 10 is integrated into a central cooling system 12 of the aircraft, which comprises a refrigerating apparatus and a plurality of cooling stations. The cooling stations of the central cooling system are connected to the refrigerating apparatus via a cooling circuit in which Galden® HT135, which is obtainable from the company Solvay Solexis, is conveyed in a circuit by a pump.

The cooling stations are preferably constructed as air-cooling apparatuses having a heat-exchanger, so that the cooling energy generated by the refrigerating apparatus can be fed to the individual cooling stations via the refrigerating medium. The air flowing through said cooling stations can thus be cooled down as a result of the thermal contact with the refrigerating medium. Disposed in the cooling circuit, upstream of each cooling station, are valves which can be activated electronically and which, in the closed state, cut off the feeding-in of refrigerating medium, and therefore cooling energy, to the respective cooling stations and, in the open state, permit the feeding-in of refrigerating medium, and therefore cooling energy, to the respective cooling stations.

A number of cooling stations of the central cooling system of the aircraft serve to cool food containers disposed in the region of the galleys of the aircraft, or else feed cooling energy to electronic components of an avionics system. The cooling stations used for cooling the food containers are installed in the region of the galleys, while the cooling station (s) for cooling the avionics system is/are disposed in a region underneath the cockpit.

A cooling station 14, which is installed in a freight compartment region in the lateral triangular regions of the aircraft and belongs to that system 10 for cooling freight goods on board an aircraft which is integrated into the central cooling system 12 of said aircraft, has an air outlet aperture 16 which is connected, via a connecting line 18, to an air inlet aperture 22 which is provided in a casing 20 of the freight compartment. Air which has been cooled down in the cooling station 14 can thus be fed into a freight compartment 24, or into a freight compartment zone of the aircraft which may optionally be thermally insulated, where it can serve to cool freight goods which are stored in a freight container 26 or a number of freight containers.

The cooling station 14 also has an air inlet aperture 28 which is connected to an air infeed line 29 of an air-conditioning installation of the aircraft in order to feed air from said air-conditioning installation of the aircraft to the cooling station 14. In operating situations in which the air-conditioning installation of the aircraft is not utilised to the full in other ways, the air fed to the cooling station 14 may be already pre-cooled or even cooled down to the desired temperature. The cooling energy made available by the refrigerating apparatus of the central cooling system 12 may then be utilised at some other point in the aircraft. If, on the other hand, the air-conditioning installation of the aircraft cannot make available sufficient cooling energy for cooling down the air to be discharged into the freight compartment 24 to the low temperature desired, the supplying of cooling energy via the cooling station 14 is partially or completely taken over by the refrigerating apparatus of the central cooling system 12.

An air outlet aperture 32 provided in the casing 20 of the freight compartment is connected to the air return line 33 of the air-conditioning installation of the aircraft. As a result, the cold air fed to the freight compartment 24 can be conveyed in a circuit, that is to say, the air which has been warmed up as a result of the thermal contact with the freight goods to be cooled can be conveyed back, via the air return line 33, into the air-conditioning installation of the aircraft again, and can again be cooled down, there and/or in the cooling station 14, to the desired low temperature.

There is preferably disposed, in all the air-conveying lines of the system 10 for cooling freight goods on board an aircraft which connect the freight compartment 24 to a region of the aircraft which lies outside said freight compartment 24, valves 31*a*, 31*b* for controlling the flow of air through said lines. The flow of air through said lines can be interrupted by closing the valves 31*a*, 31*b*. This is particularly important in the event of a fire in the freight compartment 24 of the aircraft, since said freight compartment 24 can then be isolated and flooded with a fire-extinguishing agent.

FIG. 2 shows a second embodiment of a system 10' for cooling freight goods on board an aircraft. Said system 10' for cooling freight goods on board an aircraft is, like the system 10 represented in FIG. 1, integrated into a central cooling system 12' of the aircraft having a refrigerating apparatus and also a plurality of cooling stations to which cooling energy generated by the refrigerating apparatus is fed by a refrigerating medium which is conveyed in a cooling circuit by a pump in said circuit. A cooling station 14' of the system 10' for cooling freight goods on board an aircraft is installed, as in the system 10 represented in FIG. 1, in a region of the freight compartment in the lateral triangular regions of the aircraft.

An air inlet aperture 28' of the cooling station 14' is, once again, connected to an air infeed line 29' of an air-conditioning installation of the aircraft.

As distinct from the system 10 represented in FIG. 1, however, in the system 10' shown in FIG. 2 for cooling freight goods on board an aircraft, an air outlet aperture 16' of the cooling station 14' is directly connected to an air inlet aperture 36 provided in a wall 34 of the freight container. A first coupling element 38, which is constructed integral with the cooling station 14', serves to connect the air outlet aperture 16' of the cooling station 14' to the air inlet aperture 36 provided in the wall 34 of the freight container. Said first coupling element 38 extends from the air outlet aperture 16' of the cooling station 14' through a first connecting aperture 40 provided in a casing 20' of the freight compartment and is detachably connected to the air inlet aperture 36 provided in the wall 34 of the freight container. The first coupling 38 has a sealing element 42 of bipartite construction for connecting said first coupling element 38 in a sealing manner to the air inlet aperture 36 provided in the wall 34 of the freight container.

The freight container 26', with the freight goods which are to be stored under cool conditions disposed in it, can thus be connected in a simple manner to the cooling station 14' of the cooling system 10' by means of the first coupling element 38 as soon as said freight container is disposed in its intended position in the freight compartment 24' of the aircraft. As a result, air which has been cooled down in the air-conditioning installation of the aircraft and/or in the cooling station 14' can be blown directly into the freight container 26', where it can be used for cooling the freight goods which are stored in said freight container 26'.

The freight container 26' also has venting apertures 44 via which the air blown into said freight container 26' can be conducted away again out of said freight container 26' and into the freight compartment 24' of the aircraft, and from there into the surrounding atmosphere. In the embodiment shown, no provision is made for conveying the air blown into the freight container 26" back into an air return line 33" of the air-conditioning installation of the aircraft. However, connection of the freight compartment 24" to the air return line 33" of the air-conditioning installation of the aircraft, in a manner similar to that in the embodiment shown in FIG. 1, is also conceivable.

The system 10' shown in FIG. 3 for cooling freight goods on board an aircraft differs from the system 10' represented in FIG. 2 merely through the fact that an air return line 33' of the air-conditioning installation of the aircraft is directly connected, via a second coupling element 46', to an air outlet aperture 48 provided in the wall 34 of the freight container. The second coupling element 46 is constructed integral with the air return line 33' of the air-conditioning installation of the aircraft and is routed through a second connecting aperture 50 constructed in the casing 20' of the freight compartment, so as to be detachably connected to the air outlet aperture 48 constructed in the wall 34 of the freight container. The second coupling element 46 also comprises, in a manner similar to the first coupling element 38, a sealing element 52 of bipartite construction which serves to connect the second coupling element 46 in a sealing manner to the air outlet aperture 48 constructed in the wall 34 of the freight container.

In the system 10' shown in FIG. 3, the air which has been warmed up as a result of thermal contact with the freight goods in the freight container 26' which are to be cooled, can be conveyed away again out of said freight container 26' through the air outlet aperture 48 constructed in the wall 34 of the freight container, and back to the air-conditioning installation of the aircraft via the second coupling element 46. The air can then be cooled down to the desired low temperature again in the air-conditioning installation of the aircraft and/or in the cooling station 14'.

A third embodiment of a system 10" for cooling freight goods on board an aircraft is shown in FIG. 4. Said system 10" for cooling freight goods on board an aircraft is, once again, integrated into a central cooling system 12" of the aircraft. Said central cooling system 12" of the aircraft comprises a refrigerating apparatus which is connected, via a cooling circuit, to a plurality of cooling stations in order to feed cooling energy generated by said refrigerating apparatus to said cooling stations by means of a refrigerating medium which is conveyed in the cooling circuit by a pump in said circuit.

As distinct from the systems 10, 10' discussed above, however, the cooling station 14" of the system 10" shown in FIG. 4 for cooling freight goods on board an aircraft is not fixedly installed in the region of a freight compartment 24" of the aircraft, but is integrated into a freight container 26" for receiving air freight goods which are to be stored under cool conditions.

For the purpose of connecting the cooling station 14" of the system 10" for cooling freight goods on board an aircraft to the cooling circuit of the central cooling system 12", there is therefore provided, in a wall 54 of the freight container 26", a refrigerating medium inlet aperture 56 which is connected to a refrigerating medium outlet aperture 58 of the refrigerating apparatus of the central cooling system 12". In order to connect the refrigerating medium outlet aperture 58 of the refrigerating apparatus of the central cooling system 12" to the refrigerating medium inlet aperture 56 constructed in the wall 54 of the freight container, a first connecting element 60 is present, which extends through a first connecting aperture 62 constructed in a casing 20" of the freight compartment and is detachably connected to the refrigerating medium inlet aperture 54 constructed in the wall 56 of the freight container. The first connecting element 60 has a sealing element 64 of bipartite construction for connecting said first connecting element 60 in a sealing manner to the refrigerating medium inlet aperture 56 provided in the wall 54 of the freight container.

In addition to this, a refrigerating medium outlet aperture 66, which is connected to a refrigerating medium inlet aperture 68 of the refrigerating apparatus of the central cooling system 12", is constructed in the wall 54 of the freight container. In order to connect the refrigerating medium inlet aperture 68 of the refrigerating apparatus of the central cooling system 12" detachably to the refrigerating medium outlet aperture 66 provided in the wall 54 of the freight container, a second connecting element 70 is provided, which extends through a second connecting aperture 72 constructed in the casing 20" of the freight compartment.

In a manner similar to the first connecting element 60, the second connecting element 70 also has a sealing element 74 of bipartite construction for connecting said second connecting element 70 in a sealing manner to the refrigerating medium outlet aperture 66 constructed in the wall 54 of the freight container.

An electrical connecting element 76, which is routed through a third connecting aperture 78 constructed in the casing 20" of the freight compartment, is present for electrically connecting the cooling station 14" integrated into the freight container 26" to an electrical supply network of the central cooling system 12". Said electrical connecting element 76 is intended for detachable connection to an electrical connector 80 which is constructed in the wall 54 of the freight container and electrically connected to the cooling station 14".

Said cooling station 14" is disposed in a region of the freight container 26" which is separated, by a dividing wall 82, from a region of said freight container 26" in which the air freight goods to be transported are received. Constructed in said dividing wall 82 are air inlet apertures 84 through which the cold air generated by the cooling station 14" and given off via an air outlet aperture 16" can be fed to the freight goods to be cooled.

The air which has been blown into the freight container 26" can be conveyed away out of said freight container 26" again through venting apertures 44" constructed in the freight container 26" and into the freight compartment 24" of the aircraft, and from there into the surrounding atmosphere. In the embodiment shown, no provision is made for conveying the air blown into the freight container 26" back into an air return line 33" of the air-conditioning installation of the aircraft. However, connection of the freight compartment 24" or of the freight container 26" to the air return line 33" of the air-conditioning installation of the aircraft, in a manner similar to that in the embodiments shown in FIGS. 1 and 3, is also conceivable.

In order to connect an air inlet 28" of the cooling station 14" to an air infeed line 29" of the air-conditioning installation of the aircraft, a pipe 86 which is constructed integral with said air infeed line 29" extends through a fourth connecting aperture 88 constructed in the casing 20" of the freight compartment. Said pipe 86 is detachably connected to the air inlet 28" of the cooling station 14". A sealing element 90 of bipartite construction is provided for connecting the pipe 86 to the air inlet 28" of the cooling station 14" in a sealing manner.

The invention claimed is:

1. System for cooling freight goods on board an aircraft, said system having:

- a refrigerating apparatus and
- a cooling station to which cooling energy generated by said refrigerating apparatus is fed by means of a refrigerating medium and which is connected to an air infeed line of an air-conditioning installation of the aircraft in order to feed air from the air-conditioning installation of the aircraft to the cooling station, wherein an air outlet aperture of the cooling station is connectable to a freight compartment of the aircraft in order to discharge into said freight compartment air which has been cooled down to a desired temperature, and wherein an air outlet aperture provided in a casing of the freight compartment is connectable to an air return line of the air-conditioning installation of the aircraft.

2. Cooling system according to claim 1, characterised in that the air outlet aperture of the cooling station is connectable to an air inlet aperture which is provided in the casing of the freight compartment.

3. Cooling system according to claim 1, characterised in that there is disposed, in all the air-conveying lines which connect the freight compartment to a region of the aircraft which lies outside said freight compartment, a valve for controlling the flow of air through said lines.

4. System for cooling freight goods on board an aircraft, said system having:

- a refrigerating apparatus and
- a cooling station to which cooling energy generated by said refrigerating apparatus is fed by means of a refrigerating medium and which is connected to an air infeed line of an air-conditioning installation of the aircraft in order to feed air from the air-conditioning installation of the aircraft to the cooling station, wherein an air outlet aperture of the cooling station is connectable to a freight container disposed in a freight compartment of the aircraft, in order to discharge into said freight container air which has been cooled down to a desired temperature, and wherein an air outlet aperture provided in a wall of the freight container is connectable to an air return line of the air-conditioning installation of the aircraft.

5. Cooling system according to claim 4, characterised in that the air outlet aperture of the cooling station is connectable to an air inlet aperture which is provided in the wall of the freight container.

6. Cooling system according to claim 5, characterised in that a first coupling element, which is routed through a first connecting aperture constructed in a casing of the freight compartment, is provided for connecting the air outlet aperture of the cooling station to the air inlet aperture provided in the wall of the freight container.

7. Cooling system according to claim 6, characterised in that the first coupling element comprises a first sealing element for connecting said first coupling element in a sealing manner to the air outlet aperture of the cooling station, and/or a second sealing element for connecting said first coupling element in a sealing manner to the air inlet aperture provided in the wall of the freight container.

8. Cooling system according to claim 4, characterised in that a second coupling element, which is routed through a second connecting aperture constructed in the casing of the freight compartment, is provided for connecting the air return line of the air-conditioning installation of the aircraft to the air outlet aperture provided in the wall of the freight container.

9. Cooling system according to claim 8, characterised in that the second coupling element comprises a first sealing element for connecting said second coupling element in a sealing manner to the air return line of the air-conditioning installation of the aircraft, and/or a second sealing element for connecting said second coupling element in a sealing manner to the air outlet aperture provided in the wall of the freight container.

10. Cooling system according to claim 4, characterised in that there is disposed, in all the air-conveying lines which connect the freight compartment to a region of the aircraft which lies outside said freight compartment, a valve for controlling the flow of air through said lines.

11. Freight container for receiving freight goods which are intended for transport in the freight compartment of an aircraft, wherein said freight container is connectable to a cooling station of a system for cooling freight goods on board an aircraft according to claim 4, so that air which has been cooled down to a desired temperature is dischargable into the freight container, and wherein an air outlet aperture provided in a wall of the freight container is connectable to an air return line of the air-conditioning installation of the aircraft.

12. Freight container according to claim 11, characterised in that said freight container has an air inlet aperture which is provided in the wall of said freight container and which is connectable to the air outlet aperture of the cooling station.

13. System for cooling freight goods on board an aircraft, said system having:

- a refrigerating apparatus which is connectable to a cooling station in order to feed cooling energy generated by said refrigerating apparatus to said cooling station by means of a refrigerating medium, wherein the cooling station is integrated into a freight container for receiving freight goods which are intended for transport in a freight compartment of the aircraft, is connectable to an air infeed line of an air-conditioning installation of the aircraft in order to feed air from the air-conditioning installation of the aircraft to the cooling station, and has an air outlet aperture, so that air which has been cooled down to a desired temperature is dischargable into the freight container, and wherein an air outlet aperture of the freight compartment or the freight container is connectable to an air return line of the air-conditioning installation of the aircraft.

14. Cooling system according to claim 13, characterised in that the refrigerating apparatus has a refrigerating medium outlet aperture which is connectable to a refrigerating medium inlet aperture provided in a wall of the freight container.

15. Cooling system according to claim 14, characterised in that a first connecting element, which is routed through a first connecting aperture constructed in a casing of the freight compartment, is provided for connecting the refrigerating medium outlet aperture of the refrigerating apparatus to the refrigerating medium inlet aperture provided in the wall of the freight container.

16. Cooling system according to claim 15, characterised in that the first connecting element comprises a first sealing element for connecting said first connecting element in a sealing manner to the refrigerating medium outlet aperture of the refrigerating apparatus, and/or a second sealing element for connecting said first connecting element in a sealing manner to the refrigerating medium inlet aperture provided in the wall of the freight container.

17. Cooling system according to claim 13, characterised in that the refrigerating apparatus has a refrigerating medium inlet aperture which is connectable to a refrigerating medium outlet aperture provided in the wall of the freight container.

18. Cooling system according to claim 17, characterised in that a second connecting element, which is routed through a second connecting aperture constructed in the casing of the freight compartment, is provided for connecting the refrigerating medium inlet aperture of the refrigerating apparatus to the refrigerating medium outlet aperture provided in the wall of the freight container.

19. Cooling system according to claim 18, characterised in that the second connecting element comprises a first sealing element for connecting said second connecting element in a sealing manner to the refrigerating medium inlet aperture of the refrigerating apparatus, and/or a second sealing element for connecting said second connecting element in a sealing manner to the refrigerating medium outlet aperture provided in the wall of the freight container.

20. Cooling system according to claim 13, characterised in that an electrical connecting element, which is routed through a third connecting aperture constructed in the casing of the freight compartment, is provided for the electrical connection of the cooling station which is integrated into the freight container.

21. Cooling system according to claim 13, characterised in that there is disposed, in all the air-conveying lines which connect the freight compartment to a region of the aircraft which lies outside said freight compartment, a valve for controlling the flow of air through said lines.

22. Freight container for receiving freight goods which are intended for transport in the freight compartment of an aircraft, wherein said freight container comprises a cooling station which is integrated into said freight container and which is connectable to a refrigerating apparatus of a system for cooling freight goods on board an aircraft according to claim 13, and also to an air infeed line of an air-conditioning installation of the aircraft in order to feed air from the air-conditioning installation of the aircraft to the cooling station, so that air which has been cooled down to a desired temperature is dischargable into the freight container, wherein an air outlet aperture of the freight compartment or the freight container is connectable to an air return line of the air-conditioning installation of the aircraft.

23. Freight container according to claim 22, characterised in that said freight container has a refrigerating medium inlet aperture which is provided in a wall of the freight container and which is connectable to a refrigerating medium outlet aperture of the refrigerating apparatus.

24. Freight container according to claim 22, characterised in that said freight container has a refrigerating medium outlet aperture which is provided in the wall of the freight container and which is connectable to a refrigerating medium inlet aperture of the refrigerating apparatus.

25. Freight container according to claim 22, characterised in that said freight container has an electrical connector which is provided in the wall of said freight container and which is connectable to an electrical connecting element for the electrical connection of the cooling station which is integrated into the freight container.

* * * * *